United States Patent [19]

Schirmer

[11] 4,191,430

[45] Mar. 4, 1980

[54] ANTI-LOCK DEVICE FOR RAILWAY VEHICLES

[75] Inventor: Klaus Schirmer, Geiselbullach, Fed. Rep. of Germany

[73] Assignee: Knorr-Bremse GmbH, Munich, Fed. Rep. of Germany

[21] Appl. No.: 967,125

[22] Filed: Dec. 7, 1978

Related U.S. Application Data

[63] Continuation of Ser. No. 842,337, Oct. 14, 1977, abandoned.

[30] Foreign Application Priority Data

Jan. 14, 1977 [DE] Fed. Rep. of Germany ....... 2701456

[51] Int. Cl.² .............................................. B60T 8/10
[52] U.S. Cl. ................................. 303/109; 188/181 C
[58] Field of Search ................ 188/181 C; 244/111; 303/96, 106, 107, 109

[56] References Cited

U.S. PATENT DOCUMENTS

| | | | |
|---|---|---|---|
| 3,768,873 | 10/1973 | Hirzel | 303/109 |
| 3,964,796 | 6/1976 | Bremer | 303/107 |
| 4,022,513 | 5/1977 | Hirzel et al. | 303/109 X |
| 4,037,882 | 7/1977 | Taylor | 303/107 |

Primary Examiner—Charles E. Frankfort
Assistant Examiner—Reinhard J. Eisenzopf
Attorney, Agent, or Firm—Edmund M. Jaskiewicz

[57] ABSTRACT

A signal corresponding to the difference between wheel and vehicle speeds is generated when this difference exceeds a first predetermined value and this difference signal is stopped when the difference decreases below a second predetermined value. The difference signal is integrated linearly upwardly until the difference signal decreases to the second predetermined value at which point it is integrated linearly downwardly. An auxiliary signal is generated when the integrated signal is above a third predetermined value. An anti-locking signal is generated in response to the generated difference signal to release the vehicles brakes and this anti-locking signal is continued to be generated until both the difference signal and the auxiliary signal cease and at that point the brakes are again applied.

4 Claims, 3 Drawing Figures

ANTI-LOCK DEVICE FOR RAILWAY VEHICLES

This is a continuation of application Ser. No. 842,337 filed Oct. 14, 1977, now abandoned.

The present invention relates to an anti-lock device for railway and other vehicles in which a signal corresponding to the difference between the vehicle speed and wheel speed releases and applies the vehicles brakes at certain predetermined values, more particularly, to such a device which is also responsive to the co-efficient of adhesion between the wheel and the surface.

It has been known to provide vehicles, particularly railway vehicles, with an anti-lock device wherein there is generated a difference signal indicating the difference between a reference signal corresponding approximately to the vehicle speed and a signal indicative of the wheel speed. When this difference signal exceeds a first predetermined value a signal is generated which causes the brakes of the vehicles to be released. As this difference signal decreases to a second predetermined value the signal is ceased and the brakes are again applied.

In DT-AS 2,445,159 there is disclosed such an anti-lock device wherein a speed-difference signal is obtained by integration of the difference between a signal corresponding to the acceleration of the wheel and a signal corresponding to the estimated acceleration of the vehicle. This speed-difference signal is then compared with two predetermined or base values which in turn produce two signals respectively for releasing and for again applying the brakes. In addition, the retardation and acceleration of the wheel are compared with the two respective base values as result of which two additional signals are generated respectively for releasing and reapplying the brakes. The brakes can be again applied only when both brake release signals have disappeared and on a simultaneous generation of at least one signal for reapplication of the brake. This anti-lock device has the disadvantage that it can operate effectively only within a relatively narrow range of variation of the adhesion factor between the wheel and the rail. The maximum possible braking force can not be utilized in the event there is a sudden improvement in the adhesion factor because under such circumstances a reapplication signal will be generated but the concurrent existence of the generated difference signal prevents a reapplication of the brakes.

It is therefore the principal object of the present invention to provide a novel and improved anti-lock device for vehicles and particularly for railway vehicles of the type as generally disclosed herein.

It is an additional object of the present invention to provide such an anti-lock device which provides for a high-response-sensitivity over a wide range of the adhesion factor and which will utilize variations in the adhesion factor occurring during an operation of the anti-lock device to achieve optimum utilization of the maximum possible braking force.

According to one aspect of the present invention there is provided an anti-lock device particularly for railway vehicles wherein a comparator generates a signal corresponding to the difference between the wheel speed and vehicle speed when this difference exceeds a first predetermined value and which stops this difference signal when the difference decreases below a second predetermined value. The difference signal is integrated linearly upwardly until the difference signal decreases to the second predetermined value at which point the difference signal is integrated linearly downwardly. Means are provided in the integrator means for generating an auxiliary signal when the integrated signal is above a third predetermined value. An anti-locking signal is generated in response to the generated difference signal to release the vehicle brakes and this anti-lock signal is continued to be generated until both the difference signal and auxiliary signal stop at which point the brakes are again applied.

The auxiliary signal generator according to the present invention includes the time period required by the wheel to accelerate from the level when the first predetermined value is exceeded to the level of the second predetermined value. This time period is directly related and is dependent upon the existing or actual adhesion factor between the wheel and the rail. A longer time period would indicate a relatively poor existing adhesion factor and accordingly the auxiliary signal will be generated over a longer period to prevent a reapplication of the brakes. The length of the time period is thus responsive to the acceleration of the wheel as a function of the actual adhesion factor over the range of the most advantageous slippage of a curve plotting adhesion factor v. slippage.

The advantage of the disclosed anti-lock device is that it makes possible the reapplication of the brakes particularly at relatively low adhesion factors while optimally using the adhesion factor. The present anti-locking device avoids the use of differentiating elements in normal operation which is advantageous because of the known difficulties relating to such elements such as a blurring or roughening of the signals and an amplification of high-frequency interference signals.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment and modification of the present invention will be described in detail.

Figure 1:
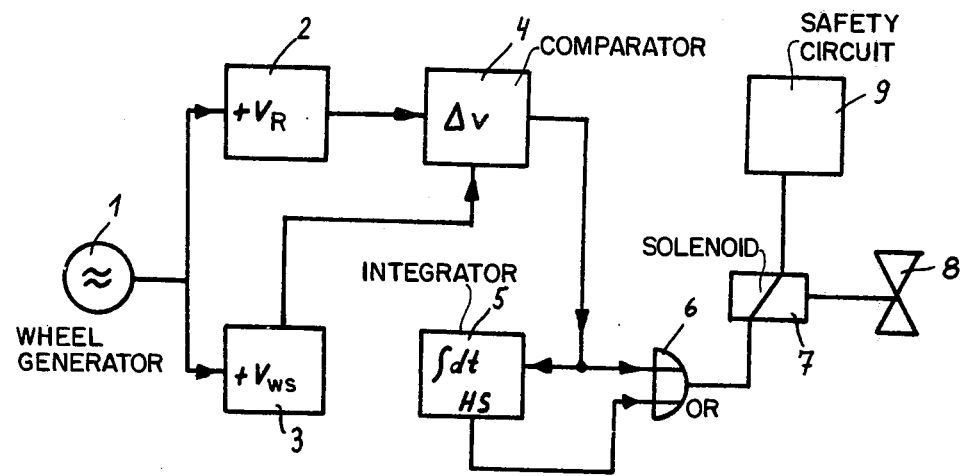
FIG. 1 is a block circuit diagram of the anti-lock device of the present invention.

As may be seen in FIG. 1, a generator 1 is driven mechanically by a monitored wheel on the vehicle and the generator emits an output voltage proportional to the rpm's or rotary speed of the wheel. The generator output is connected to a first device 2 as known in the art which generates a reference signal corresponding approximately to the translatory velocity or speed of the vehicle upon the rails, in the case of a railway vehicle. The output of the wheel generator 1 is also connected to a second device 3 which subjects the generator signal to a smoothing or proportionality factor so that the signal emitted from the device 3 is indicative of the wheel speed.

The outputs of the devices 2 and 3 are connected to a comparator 4 which performs a subtracting function to establish the difference between the reference signal and the wheel speed signal and which also generates a binary ΔV-signal to be compared with two ΔV-base values in a manner to be described in more detail below.

The output of the comparator 4 is supplied to an integrator 5 and and an OR-element 6. The output of the integrator 5 is a binary auxiliary signal (HS-signal) which is supplied to a second input of the OR-element 6. The output of OR-element 6 is connected to a solenoid 7 connected to a valve 8 wherein the solenoid is monitored by a safety circuit 9.

The operation of the device of FIG. 1 is next described with reference to the operational diagram of FIG. 2.

Figure 2:
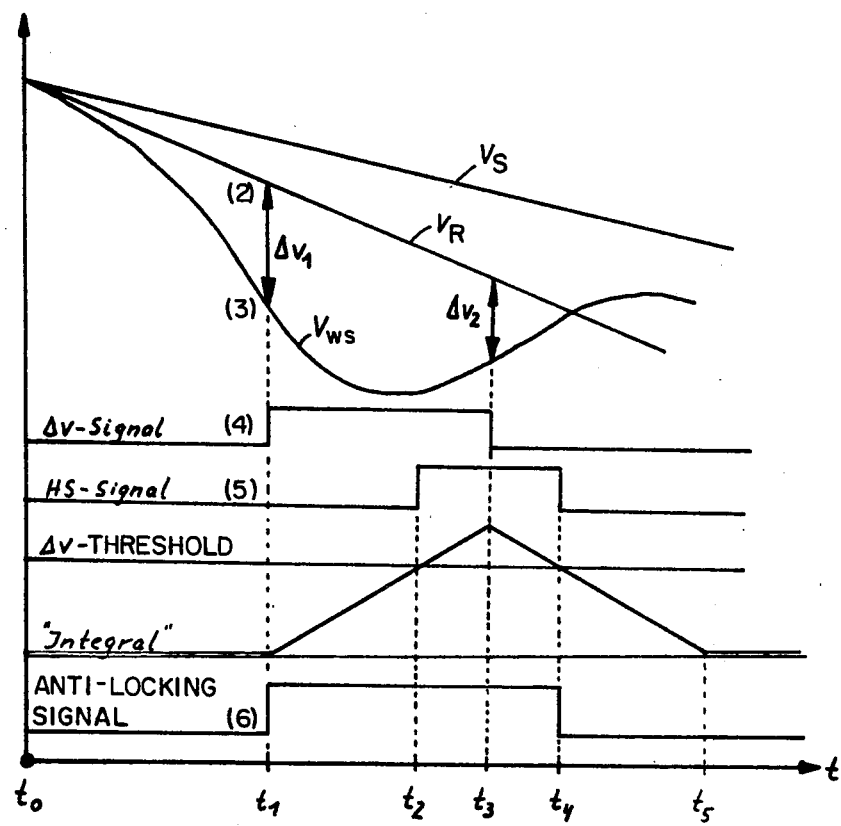
FIG. 2 is a diagram illustrating the operation of the anti-lock device with respect to a time sequence.

In FIG. 2, the line $V_S$ represents the actual speed of the train of which the rail vehicle is a part and the line $V_R$ represents the reference signal which is the output of the device 2. The wheel speed of the vehicle which is the output signal of device 3 is represented by the line $V_{WS}$.

The remaining lines on the diagram represent various signals such as the line "$\Delta V$-signal" corresponds to the output of the comparator or subtracting device 4, the line "HS-signal" to the output of integrator 5, the line "$\Delta V$-threshold" to a threshold or base signal derived from the $\Delta V$-signal, the line "integral" to an internal signal produced in the integrator 5 and the line "anti-locking signal" to the output signal of the OR-element 6.

A control cycle of the anti-lock device will next be described.

With reference to FIG. 2, the brakes are applied at the time $t_o$. The reference signal is then generated in a known manner and the wheel velocity is separated from the vehicle velocity. The difference between wheel speed and the reference signal will exceed a predetermined base or threshold value $\Delta V_1$ at a time $t_1$. A binary $\Delta V$-signal is then generated on the output of the subtracting element comprising comparator 4 and this signal is transmitted through the OR-element 6 to operate the solenoid valve 7 which in turn leads to an anti-locking signal and thus to a triggering of the anti-lock device.

Simultaneously at time $t_1$, integrator 5 begins to integrate the V-signal upwardly linearly with respect to time. The signal corresponding to the line "integral" is generated as an internal signal of the integrator 5. Should such a signal exceed the line "$\Delta V$-threshold" such as at time $t_2$, an auxiliary signal HS will then appear on the output of the integrator 5.

In the meantime, because of the triggering of the anti-lock device, the wheel speed will begin to increase so as to approach the reference line $V_R$ until at a time $t_3$ the difference between the wheel speed and reference signal will drop below a $\Delta V$-backswitching threshold ($\Delta V_2$) whose magnitude is approximately one half of the threshold signal $\Delta V_1$. At time $t_3$, the $\Delta V$-signal will disappear as may be seen in FIG. 2 and the integrator 5 begins to integrate linearly downwardly from this value. Since the auxiliary signal HS is still present as can be seen in FIG. 2, the anti-lock device remains triggered through the OR-element 6 so as to remain in operation. When during its downward integration the line "integral" reaches a $\Delta V$-threshold at time $t_4$, the auxiliary signal and also the anti-locking signal will be terminated. Accordingly, the solenoid valve 8 will be closed and the brake pressure will be increased again so that the brake will be reapplied.

According to the present invention, the integration constants that determine the slope of the line "integral" for the upward integration from time $t_1$ to time $t_3$, and the downward integration from time $t_3$ to time $t_5$ can be set or determined individually. It is thus advantageous to set or establish these constants differently as a function of the selected range of the adhesion factor which can normally be expected under the anticipated operating conditions. The present invention also provides that the $\Delta V$-threshold line can be dynamically selected so as to be a function of the assumed train speed and to define the relationship $$\Delta V\text{-}threshold = c\,(k\cdot v + v_o)$$

wherein c and k are constants, v the assumed train speed and vo a lower constant speed of approximately 5 km/h below which the anti-lock device should no longer be triggered. As result, the line V-threshold will have a slight downward inclination from $t_0$ with this inclination or slope being determined by the constants c and k. Such a slope is not shown in FIG. 2 since in FIG. 2 the line V-threshold is substantially horizontal.

In accordance with the above relationship, constants $\Delta V_1$ and $\Delta V_2$ are similarly formed dynamically and the constant c is so selected that the $\Delta V_1$ threshold or base value is twice as large as the $\Delta V_2$ threshold value for switching off the anit-lock device.

It is pointed out that the present invention improves adapting or modifying the duration during which the anti-lock device is operated with respect to the adhesion factor which is actually present. The time period $t_2$ to $t_3$ or to $t_4$ is directly dependent on the actual adhesion factor. It is thus apparent that the duration of the period over which the anti-lock device is operated is increased at small adhesion factors which in spite of a slower acceleration provides a sufficient train speed approximation for the slipping wheel.

In the event that the adhesion factor is increased during an existing operation of the anti-lock device, the present invention also provides that where the wheel acceleration exceeds a predetermined base or threshold value the line "integral" is immediately set to 0 as a result of which auxiliary signal HS disappears and the brakes can be immediately engaged again. However, it is a feature of the invention that one can avoid the use of acceleration and/or retardation signals during normal operation of the anti-lock device during which there are no sudden or abrupt variations in the adhesion factor.

Figure 3:
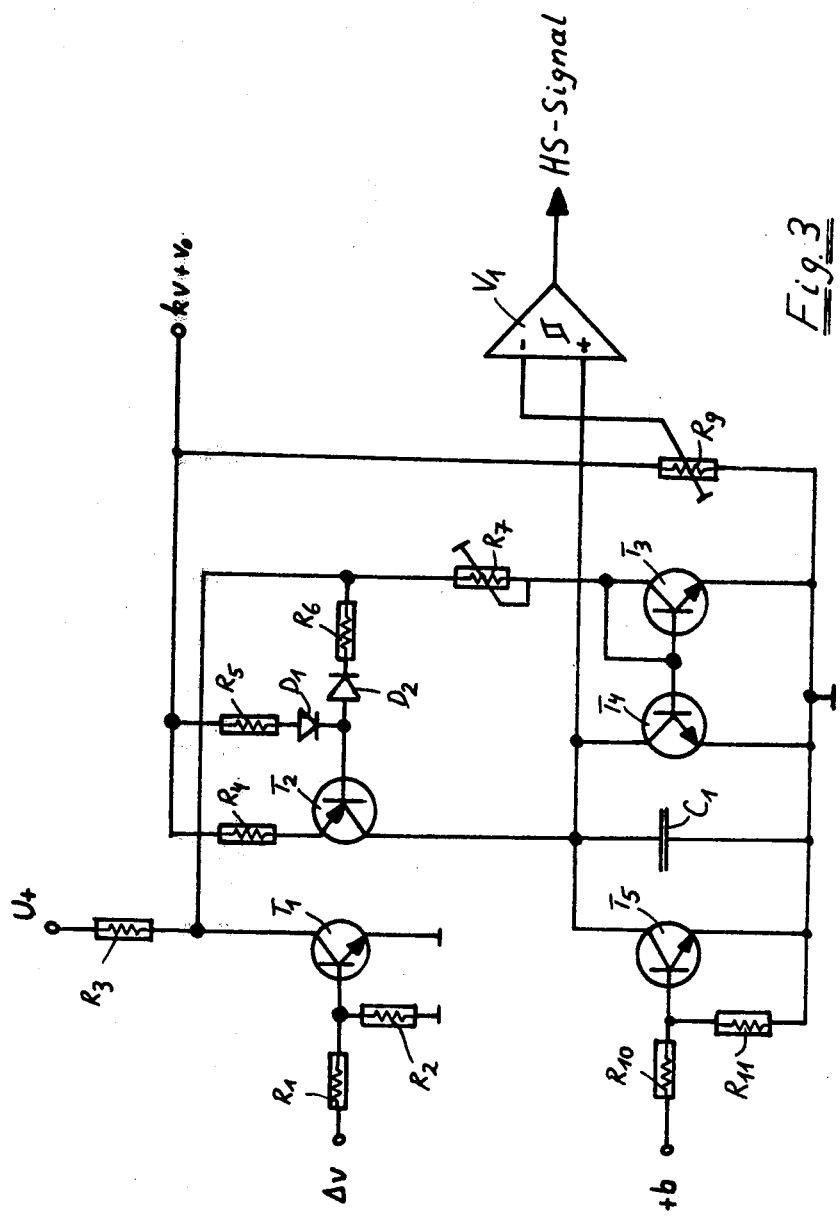
FIG. 3 is a circuit diagram showing diagrammatically the integrator used in the present invention and incorporated in the circuit diagram of FIG. 1.

The detail circuitry of the integrator 5 is illustrated in FIG. 3 wherein there is provided a transistor $T_1$ having its base connected to an input voltage divider $R_1$, $R_2$ and having its collector connected through a resistance $R_3$ to a supply voltage $U_b$. The emitter of transistor $T_1$ is connected to ground. A $\Delta V$-signal is supplied to the input voltage divider $R_1$, $R_2$.

The collector of transistor $T_1$ is connected through a resistance $R_6$ and a diode $D_2$ connected in the blocking direction to the base of a transistor $T_2$. The base of transistor $T_2$ is connected through a diode $D_1$ in the conducting or non-blocking direction and through resistance $R_5$ to a dynamic supply voltage $kv + v_o$. The conducting direction of diode $D_1$ is from the supply voltage to the base. The emitter of the pnp transistor $T_2$ is connected through an adjustable resistance $R_4$ to the dynamic supply voltage.

Transistor $T_2$ has its collector connected to an integrating capacitor $C_1$ whose other side is connected to ground. Connected in parallel with capacitor $C_1$ is a transistor circuit consisting of transistors $T_3$ and $T_4$ connected in a so-called current mirror relationship. In such a connection, the emitters of transistors $T_3$ and $T_4$ are connected to ground, the collector of transistor $T_4$ is connected to capacitor $C_1$, the base of transistor $T_4$ is connected to the collector and at the same time to the base of transistor $T_3$. The collector of transistor $T_3$ is connected through an adjustable resistance $R_7$ to the collector of transistor $T_1$.

Capacitor $C_1$ is connected to an input (+input) of a hysteresis amplifier $V_1$ which functions as a comparator. A second input (−input) of the amplifier $V_1$ is connected to the central tap of a potentiometer $R_9$ which is connected between ground and the dynamic supply voltage. The output of amplifier $V_1$ is the auxiliary signal HS.

According to a modification of the invention, the capacitor $C_1$ can be further connected to the collector of a transistor $T_5$ whose emitter is connected to ground and whose base is subjected to the effect of a +b-signal through an input voltage divider $R_{10}$, $R_{11}$. The +b-signal corresponds to the acceleration of the wheel.

In operation of the circuit of FIG. 3, when a binary $\Delta V$-signal from comparator 4 appears on resistance $R_1$, the transistor $T_1$ becomes conductive and its collector has a potential of approximately zero. The voltage on an end of resistance $R_6$ thus similarly becomes zero. One half of the dynamic voltage, since $R_5$ and $R_6$ have the same value, is applied to the base of transistor $T_2$ through the voltage divider $R_5$, $R_6$ and the diodes $D_1$ and $D_2$ connected here in the conducting direction. Transistor $T_2$ is thus conductive and functions as a constant current source for the integrating capacitor $C_1$. As result, the upward integration now takes place. The integration constant is adjustable through the resistance $R_4$. The transistor circuit consisting of $T_3$ and $T_4$ is at this time without any effect since the collector voltage of transistor $T_3$ and thus also the base voltage of transistor $T_4$ are at zero and transistor $T_4$ is ineffective.

The voltage on capacitor $C_1$ then increases in accordance with the "integral" line of FIG. 2. When this voltage reaches the dynamic threshold value established by resistance $R_9$, amplifier $V_1$ will be opratively connected and auxiliary signal HS will appear at its output.

When the V-signal then disappears, transistor $T_1$ will be shut off and its collector voltage will be at approximately the value of $+U_b$. Supply voltage $+U_b$ is applied to the end of the resistance $R_6$. Diode $D_2$ is shut off. Since there is no longer any flow of base current to transistor $T_2$, transistor $T_2$ is thus blocked and will no longer function as a current source for the upward integration of capacitor $C_1$. The upward integration is thus completed at the time $t_3$.

At the same time, supply voltage $+U_b$ is applied to resistance $R_7$ and transistor $T_3$ also receives this supply voltage at its base. Transistor $T_3$ thus becomes conductive and the current flowing through this transistor is determined by the resistances $R_3$ and $R_7$. This current can be adjusted by means of resistance $R_7$.

Since the same current flows through the current mirror circuit as through the transistors $T_3$ and $T_4$, capacitor $C_1$ will be discharged with a constant current adjustable through resistance $R_7$ which corresponds to a downward integration. When the voltage on capacitor $C_1$ drops below the threshold value established by resistance $R_9$, the amplifier $V_1$, because of hysteresis, will switch back and the auxiliary signal HS on the output of amplifier $V_1$ disappears.

The present invention may be further modified so that the transistor $T_5$ becomes conductive on appearance of a +b-signal whereupon capacitor $C_1$ is discharged very quickly so that the auxiliary signal similarly disappears very quickly.

It should be borne in mind that the supply voltage $+U_b$ to transistor $T_1$ must be greater than the dynamic voltage supply to transistor $T_2$. The supply voltage of transistor $T_2$ may be so selected as to be constant. However, it is preferable that this supply voltage be dynamic, i.e., as a function of the reference train speed so as to provide a further advantage of the present invention. The remaining steps which are necessary to establish a complete anti-lock device can be readily derived by one skilled in the art from FIG. 1 as illustrated and described above.

Thus it can be seen that the present invention has disclosed an anti-lock device which is readily responsive to the actual adhesion factor between the wheel and the rail. The duration of the operation or energization of the anti-lock device is thus quickly adapted to the existing adhesion factor.

It will be understood that this invention is susceptible to modification in order to adapt it to different usages and conditions, and accordingly, it is desired to comprehend such modifications within this invention as may fall within the scope of the appended claims.

What is claimed is:

1. In an anti-lock device particularly for railway vehicles, the combination of means for generating a signal indicative of the wheel speed, means for generating a reference signal substantially indicative of the speed of the vehicle, comparator means connected to both said wheel speed and vehicle speed signal generating means for generating a signal corresponding to the difference between said wheel and vehicle speeds when said difference exceeds a first predetermined value and for ceasing said difference signal when said difference decreases below a second predetermined value, said first predetermined value being greater than said second predetermined value, integrator means connected to the output of said comparator means for integrating said difference signal linearly upwardly until the difference signal ceases at said second predetermined value and for integrating linearly downwardly from said second predetermined value, said integrator means having means therein for generating an auxiliary signal indicative of the adhesive factor between the vehicle wheel and the surface upon which the wheel is rolling when the integrated signal is above a third predetermined value, said third predetermined value being derived from said difference signal and being a function of an assumed speed of the vehicle, said third predetermined value being linearly dependent upon said reference signal, and means connected to the output of said comparator means for generating an anti-locking signal in response to said generated difference signal to release the vehicle brakes, said anti-locking signal being continuously generated until the point at which both said difference signal and said auxiliary signal have ceased at which point the brakes are applied.

2. In an anti-lock device as claimed in claim 1 wherein said integrating means comprises a current source energized by a difference signal, a capacitor connected to said current source to be charged when said current source is energized, and a second current source deenergized by a difference signal so as to discharge said capacitor.

3. In an anti-lock device as claimed in claim 2 wherein said second current source comprises a plurality of electrical circuit elements connected in a current mirror relationship.

4. In an anti-lock device as claimed in claim 2 wherein said intergrating means further comprises a transistor having a steep discharge-time constant defining a third current source and connected in parallel with said capacitor.

* * * * *